United States Patent Office 3,501,490
Patented Mar. 17, 1970

3,501,490
AZOLE COMPOUNDS
Erwin Maeder, Aesch, Basel-Land, and Adolf Emil Siegrist, Basel, Switzerland, assignors to Ciba Limited, Basel, Switzerland, a company of Switzerland
No Drawing. Filed Sept. 21, 1966, Ser. No. 580,882
Claims priority, application Switzerland, Oct. 4, 1965, 13,643/65
Int. Cl. C07d 85/48, 87/38
U.S. Cl. 260—307
7 Claims

ABSTRACT OF THE DISCLOSURE

The invention provides new 3-phenyl-7-[benzoxazolyl-(2')]-coumarins which may be substituted in the benzoxazolyl moiety with alkyl, alkoxy, halogen, cycloalkyl, carboxyl, carboxylic acid ester or amide, carbalkoxyalkyl, cyanoalkyl, phenylalkyl or phenyl or wherein to the benzene ring may be attached a fused-on six-membered carbocyclic ring. The said compounds are useful as optical whitening agents.

---

The present invention provides new, valuable azole compounds characterized by the common structural skeleton of a 7-[aryloxazolyl-(2')]-coumarin of the formula (1a)
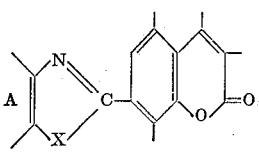

in which A represents the complement to an aryl radical, X is the complement of the azole ring represented by the hetero atoms —O—, —S— or

and the vacant valencies are occupied by hydrogen atoms or non-chromophoric substituents, as well as processes for the use of these new azole compounds for optically brightening a wide variety of organic substrates.

From among the coumarins containing the structural element defined above there may be mentioned above all their 3-aryl-coumarin derivatives. Accordingly, the present invention is primarily concerned with azole compounds of the formula (1b)
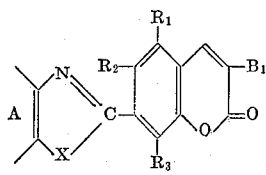

in which A represents an aromatic carbocycle condensed with the azole ring in the manner indicated by the valency lines; X represents —O—, —S— or —NQ— (where Q stands for hydrogen, alkyl, hydroxyalkyl, cyanoalkyl, aralkyl or sulphonylalkyl), each of the substituents $R_1$, $R_2$ and $R_3$ represents hydrogen, a lower alkyl group or alkoxy group, and $B_1$ represents a 5-membered or 6-membered aromatic carbocyclic or heterocyclic residue.

While the term aromatic carbocyclic system describes above all a benzene ring system, this does not exclude condensed ring systems such as naphthalene rings or partially hydrogenated naphthalene rings.

Of special value among the compounds of the above definition are those new azole compounds which correspond to the formula (2)
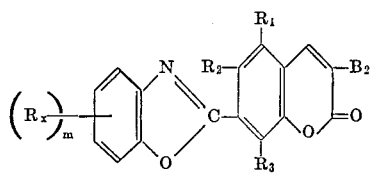

where $m$ is a whole number from 1 to 4; $R_x$ represents a substituent from the series hydrogen, alkyl, alkoxy, halogen, carboxyl, carboxylic acid ester, carboxylic acid amide, carboxylic acid nitrile, lower alkyls substituted by carboxyl or carboxylic acid ester groups or carboxylic acid amide or nitrile groups, phenyl groups, phenylalkyl groups, possibly substituted amino groups, sulphonic acid groups, sulphonic acid alkyl or aryl ester groups, sulphonamide groups, sulphinic acid alkyl and aryl ester groups, and 2 ortho-positioned residues $R_x$ together may form a group —$CH_2$—$CH_2$—$CH_2$—$CH_2$—; each of the residues $R_1$, $R_2$ and $R_3$ represents hydrogen, a lower alkyl group or alkoxy group, and $B_2$ represents one of the residues

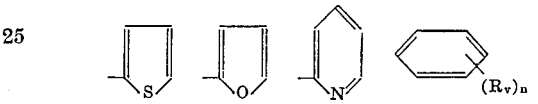

where $R_v$ stands for hydrogen, a lower alkyl group or alkoxy group, halogen, carboxyl group, carboxylic acid ester or amide group, a nitrile group, sulphonic acid group, sulphonic acid ester or amide group or a sulphinic acid ester group, and $n$ is a whole number from 1 to 4.

Of special value are azole compounds of the formula (3)
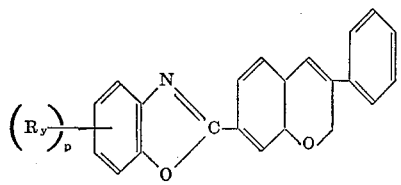

in which $R_y$ is a substituent from the series hydrogen, alkyl, alkoxy, halogen, cycloalkyl, carboxyl, carboxylic acid ester or amide, carbalkoxyalkyl, cyanoalkyl, phenylalkyl or phenyl; $p=1$, 2 or 3, and two vicinal residues $R_y$ together with the benzene ring to which they are attached may form a fused six-membered carbocyclic system.

Within the definitions given above the following are of special importance: Alkyl groups containing up to 12 carbon atoms, alkoxy groups with up to 6 carbon atoms; in the range of cycloalkyl groups the cyclohexyl group, carboxylic acid ester groups representing alkyl ester groups containing up to 12 carbon atoms in the alkyl group or allyl ester groups; the carbalkoxyalkyl group with up to 6 carbon atoms; carboxylic acid amide groups whose amide group is substituted by a heterocycle or by an alkyl or hydroxyalkyl group containing up to 12 carbon atoms; cyanoalkyl groups with up to 4 carbon atoms and phenylalkyl groups whose alkyl grouping contains up to 4 carbon atoms. For fused-on six-membered carbocycles—which are visualized as a condensate from two vicinal residues $R_y$—there is particularly suitable the tetrahydronaphthalene ring system.

Furthermore, a special subgroup of important compounds corresponds to the formula (4)
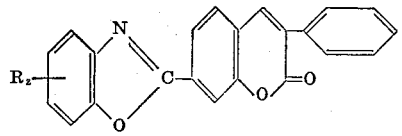

in which $R_z$ represents a substituent from the series hydrogen, alkyl with 1 to 8 carbon atoms, alkoxy with 1 to 4 carbon atoms, chlorine, the carboxyl group, carboxylic acid alkyl ester group, carboxylic acid amide group, a phenyl group, a phenyl-alkyl group whose alkyl grouping contains up to 4 carbon atoms, or an alkyl group with 1 to 8 carbon atoms substituted by a nitrile group or carboxylic acid alkyl ester group.

The invention further includes the use of the compounds defined above—more especially those of the Formulae 2, 3 and 4—as optical brighteners for a wide variety of organic materials suitable for optical brightening, as well as a process for optically brightening such materials, wherein such optical brighteners are incorporated with or superficially applied to the material concerned.

From the large number of compounds obtained by, or suitable for use according to, this invention there may be mentioned the following examples:

(5) 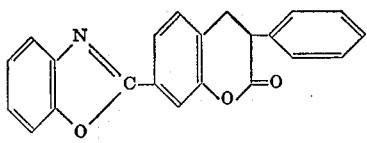

(6) 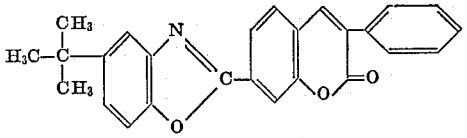

(7) 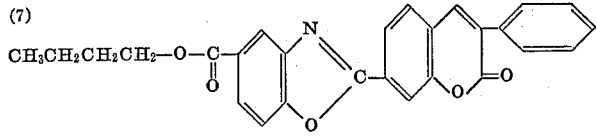

(8) 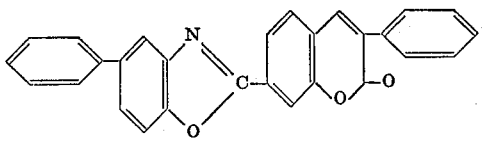

(9) 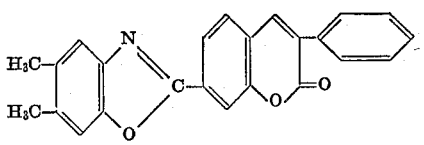

(10) 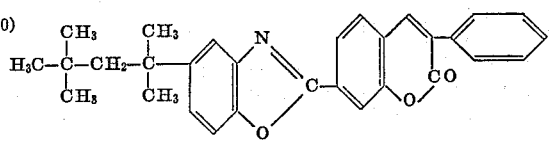

(11) 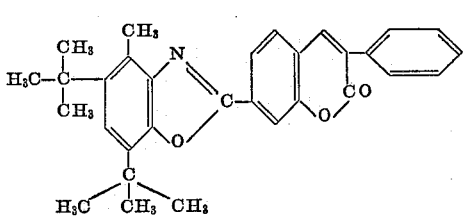

(12) 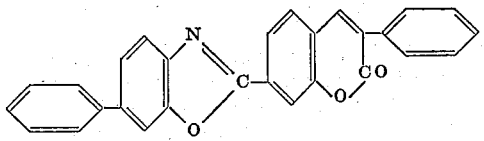

(13) 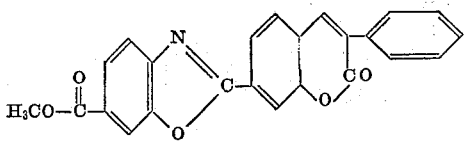

(14) 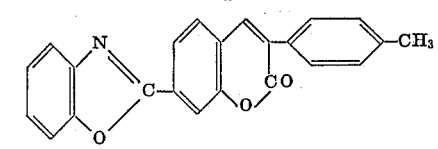

(15) 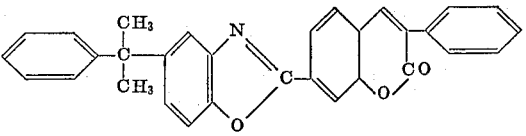

The new azole compounds of the general Formulae 1 are accessible by known processes performed in an analogous manner. For example, according to an advantageous manufacturing process a coumarin-7-carboxylic acid compound of the formula

(16) 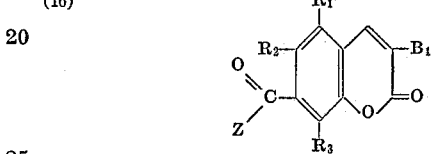

—in which Z represents a hydroxyl group or a halogen atom, especially chlorine—is reacted with an aminobenzene of the formula

(17) 

to form a coumarin-7-carboxylic acid derivative of the formula

(18) 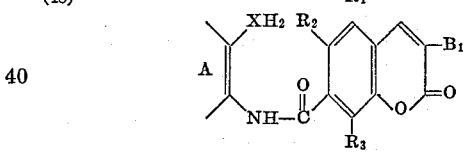

whereupon cyclization to form the azole ring is performed in the known manner.

The reaction between the selected components of the Formulae 16 and 17 may be performed with or without intermediate isolation of the primarily formed coumarin-7-carboxylic acid derivative of the Formula 18 by heating to an elevated temperature, for example to 120 to 350° C., advantageously in an inert gas, for example in a current of nitrogen, if desired or required in the presence of a catalyst. Suitable catalysts are, for example, boric acid, boric acid anhydride, zinc chloride, para-toluenesulphonic acid, also polyphosphoric acids including pyrophosphoric acid. When boric acid is used as catalyst, it is advantageously used in an amount of 0.5 to 5%, referred to the total weight of the reaction mixture. It is also possible to use additionally high-boiling, polar, organic solvents such, for example, as dimethylformamide, dichlorobenzene, trichlorobenzene or aliphatic, possibly etherified, hydroxy compounds, for example propyleneglycol, ethylene-glycol monoethyl ether or diethyleneglycol diethyl ether or high-boiling esters of phthalic acid, for example dibutyl phthalate.

The present process is advantageously carried out in two stages: In the first stage a carboxylic acid halide of the Formula 16 is condensed with an ortho-amino converted at a temperature from 150 to 350° C. if desired or ganic solvent such as toluene, a xylene chlorobenzene, dichlorobenzene, trichlorobenzene or nitrobenzene, at a temperature from 100 to 200° C., and in the second stage the resulting acyl compound of the Formula 18 is converted at a temperature from 150 to 350° C., if desired or required in the presence of a catalyst, into the compound of the Formula 1. When a carboxylic acid chloride is used as starting material (especially when condensing with an amino compound of the Formula 17 containing carboxylic acid ester groups), said chloride can be prepared immediately before the condensation wth the ortho-amino compound from the free carboxylic acid and thionylchloride, if desired or required in the presence of a catalyst such as pyridine, in the solvent in which subsequently the condensation is carried out.

If desired, substituents as defined in connection with the Formulae 1 may be subsequently introduced into the parent compounds of the Formulae 1 obtained by the present process.

Thus, water-soluble derivatives are obtained when;

(a) A parent compound of the Formulae 1 is sulphonated, for example with sulphuric acid monohydrate, chlorosulphonic acid or with sulphuric acid containing sulphur trioxide, if required with heating, whereupon the sulphonic acid group is converted with an organic or preferably inorganic base into the corresponding salts;

(b) One or several primary or secondary amino groups of the azole derivative of the Formulae 1 are converted with a sultone, for example with propanesultone or butanesultone at an elevated temperature into the corresponding alkylsulphonic acid derivative;

(c) One or several primary amino groups of the azole derivative of the Formulae 1 are converted with an aldehyde-bisulphite compound, for example with formaldehyde-alkali metal bisulphite, into the corresponding ω-methanesulphonic acid derivative;

(d) One or several primary amino groups of the azole derivative of the Formulae 1 are reacted with alkyl- or aralkylsulphonic acid, for example bromoethanesulphonic or benzylchloride-sulphonic acid;

(e) One or several primary or secondary amino groups or hydroxyl groups of the azole derivative of the Formulae 1 are linked with phenolsulphonic or anilinesulphonic acids by means of s-triazinyl-2-yl bridges;

(f) In one or several hydroxyl groups of a compound of the Formulae 1 a polyalkylene ether chain is introduced with an alkylene oxide such as ethylene oxide or propylene oxide or with a polyalkylene ether monohalide;

(g) One or several groups of the azole derivative of the Formulae 1 that are capable of quaternation are reacted with a quaternating agent, for example methyl iodide, dimethylsulphate, benzylchloride or toluenesulphonylalkyl ester at an elevated temperature, if required under pressure;

(h) One or several halogenalkyl groups of the azole derivative of the Formulae 1 are converted with tertiary bases, such for example as pyridine, into the corresponding quaternary derivatives.

The new optical brighteners of the composition defined above display in the dissolved or finely dispersed state a remarkable fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

(I) Synthetic organic materials of high molecular weight:

(a) Polymers based on organic compounds containing polymerizable carbon-to-carbon double bonds, i.e. their homopolymers and copolymers and products obtained by after-treating them, such for instance as cross-linked, grafted or decomposition products, polymer blends or the like; relevant examples are:

Polymers based on α,β-unsaturated carboxylic acids, especially of acryl compounds of olefinic hydrocarbons (especially poly-α-olefines), polymers based on vinyl and vinylidene compounds of halogented hydrocarbons, of unsaturated aldehydes and ketones, of allyl compounds or the like; their graft polymerization products or cross-linked products (e.g., by means of bifunctional or polyfunctional cross-linking agents), or products accessible by partial decomposition or modification of reactive groupings.

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts;

(c) Polycondensation products or precondensates based on bifunctional or polyfunctional compounds containing condensable groups, their homo- and co-condensates and products obtained by after-treating them; relevant examples are:

Polyesters, saturated (especially aromatic, polyesters, e.g. polyethylene terephthalate) or unsaturated (e.g. maleic acid-dialcohol polycondensates and their cross-linked products with polymerizable vinyl monomers), linear or branched (e.g. alkyd resins).

Polyamides (e.g. hexamethylenediamine adipate) maleinate resins, melamine resins, phenolic resins (novolaks), aniline resins, furan resins, carbamide resins and their precondensates, and similarly constituted products, polycarbonates, silicone resins and others.

(d) Polyadducts such as polyurethanes (if desired cross-linked); epoxy resins.

(II) Semisynthetic organic materials e.g. cellulose esters or mixed esters (acetate, propionate), nitrocellulose, cellulose ethers, regenerated cellulose (vicose, cuprammonium cellulose) or products obtained by after-treating them, casein plastics.

(III) Natural organic materials of animal or vegetable origin, e.g. based on cellulose or proteins such as wool, cotton, silk, bast, jute, furs and hairs, leathers, finely dispersed wood masses, natural resins (such as colophony, especially lacquer resins); furthermore rubber, gutta percha, balata and products obtained by after-treating or modifying them, decomposition products, products accessible by conversion of reactive groups.

The organic materials that can be optically brightened may be at any stage of their processing (raw materials, semi-finished products or finished articles) and physical states. They may be in the form of structures of any desired shape, that is to say, for example, they may be predominantly three-dimensional bodies such as plates, sections, injection mouldings or components of any desired kind, chips and granulates, foamed articles; predominantly two-dimensional bodies such as films, foils, lacquers, impregnations or coatings; or predominantly uni-dimensional bodies such as filaments, fibres, flocks, or wires. The said materials may also be as yet not shaped and be in the most varied homogeneous and inhomogeneous forms of dispersion and physical states, fo rexample in the form of powders, solutions, emulsions, dispersions, latices, sols, gels, putties, pastes, waxes, adhesives, pore fillers or the like.

Fibrous materials may, for example, take the form of continuous filaments, staple fibres, flocks, hanks, yarns, fibre fleeces, felts, cottonwool, napped products or of textile fabrics or textile laminates, knitwear, of papers, cardboards, paper pulps or the like.

The compounds to be used according to this invention are of special value for the treatment of textile organic materials, especially woven textile fabrics. If fibrous substrates, such as those mentioned above, are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films or other mouldings they may be added to the moulding or injection moulding composition etc. or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the prepolymers) or a polyaddition.

The new optical brighteners are distinguished by their particularly good heat resistance and fastness to light and to migration, and by their great brightening power.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may also be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent: Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formulae can also be used as scintillators for various photographic purposes, such as electrophotographic reproduction or for supersensitizing.

If the brightening operation is to be combined with other treating or improving operations, the combined treatment is advantageously performed with the use of a suitable preparation which contains in addition to optically brightening compounds of the above general formula also dispersants, detergents, carriers, dyestuffs, pigments or dressing agents.

The treatment of various fibrous substrates, e.g. polyester fibers with the brighteners of this invention may also consist, for example in impregnating these fibres with an aqueous dispersion of the brightener at a temperature below 75° C., e.g. at room temperature, and then subjecting it to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

EXAMPLE 1

A mixture of 7.98 g. of 3-phenyl-coumarin-7-carboxylic acid of the formula

(19) 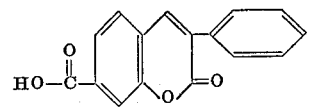

3.5 g. of 1-amino-2-hydroxybenzene, 500 mg. of boric acid in 20 ml. of diethyleneglycol-di-n-butyl ether is heated under nitrogen during 30 minutes to 240 to 245° C. Water escapes, and a slightly turbid solution is obtained which is allowed to cool to 100° C., 50 ml. of ethanol are stirred in, and the precipitate is suctioned off at room temperature, washed with alcohol and dried, to yield 9.5 g. of an orange, crystalline powder melting at 274 to 275° C. Crystallization from orthodichlorbenzene with the aid of active carbon furnishes 8 g. of the compound of the formula (5) 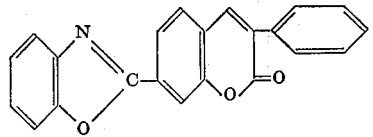

in the form of light-yellow prisms melting at 275 to 276° C.

Calc'd for $C_{22}H_{13}NO_3$ (mol. weight 339.33) (percent): C, 77.87; H, 3.86; N, 4.13. Found (percent): C, 78.08; H, 3.98; N, 4.22.

The 3-phenylcoumarin-7-carboxylic acid of the Formua 19 may be prepared in the following manner:

A mixture of 33.2 g. of 4-carboxy-2-hydroxybenzaldehyde and 86 g. of benzylcyanide in 50 ml. of piperidine with 3 ml. of water is heated for 12 hours at 100° C. The initially dark, viscous solution is gradually transformed into a thick paste which is stirred with 125 ml. of glacial acetic acid, and the precipitate is suctioned off at 20° C. and rinsed with glacial acetic acid and water. After drying, there are obtained 37.7 g. of a light-beige powder melting at 314 to 315° C.

Crystallization from dioxane with the aid of active carbon furnish the 3-phenylcoumarin-7-carboxylic acid of the Formula 19 as small colourless needles melting at 315 to 315.5° C.

Calc'd for $C_{16}H_{10}O_4$ (mol. weight 266.24) (percent): C, 72.18; H, 3.79. Found (percent): C, 72.32; H, 3.88.

The following 7-benzoxazolyl-coumarin compounds are accessible in an analogous manner:

(6)
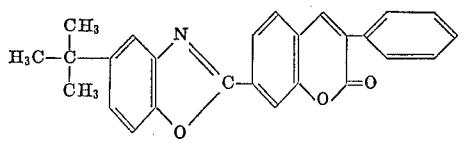

Greenish yellow flakes from dimethylformamide, melting at 266 to 267° C.

Calc'd for $C_{26}H_{21}NO_3$ (mol. weight 395.44) (percent): C, 78.96; H, 5.35; N, 3.54. Found (percent): C, 79.21; H, 5.56; N, 3.59.

(8)
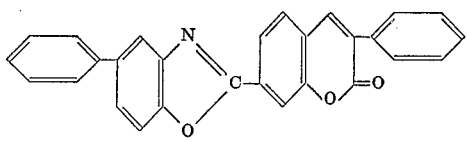

Pale yellowish small needles from chorobenzene, melting at 305 to 306° C.

Calc'd for $C_{28}H_{27}NO_3$ (mol. weight 415.42) (percent): C, 80.95; H, 4.12; N, 3.37. Found (percent): C, 81.04; H, 4.07; N, 3.50.

(9)
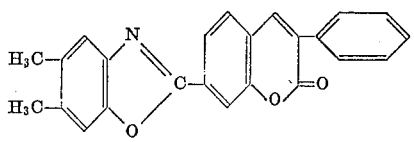

Yellow prisms from xylene, melting at 306 to 307° C.

Calc'd for $C_{24}H_{17}O_3N$ (mol. weight 367.38) (percent): C, 78.46; H, 4.66; N, 3.81. Found (percent): C, 78.22; H, 4.77; N, 3.70.

(10)
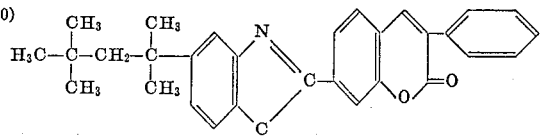

Light-yellow small needles from xylene, melting at 252 to 253° C.

Calc'd for $C_{30}H_{29}O_3N$ (mol. weight 451.51) (percent): C, 79.79; H, 6.47; N, 3.10. Found (percent): C, 79.67; H, 6.27; N, 3.11.

(11)
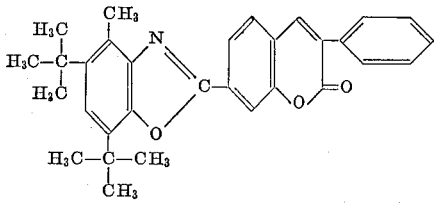

Pale yellowish small needles from toluene+alcohol, melting at 245 to 247° C.

Calc'd for $C_{31}H_{31}O_3N$ (mol. weight 465.57) (percent): C, 79.97; H, 6.71; N, 3.01. Found (percent): C, 80.00; H, 6.93; N, 2.81.

(12)
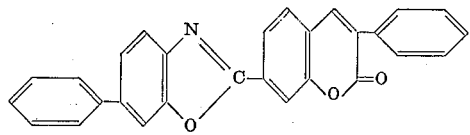

Light-yellow flakes from xylene, melting at 261 to 262° C.

Calc'd for $C_{28}H_{17}O_3N$ (mol. weight 415.42) (percent): C, 80.95; H, 4.12; N, 3.37. Found (percent): C, 81.03; H, 4.40; N, 3.41.

(15)
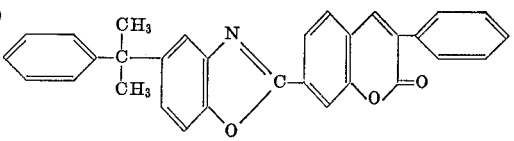

Light-yellow flakes from xylene, melting at 255 to 256° C.

Calc'd for $C_{31}H_{23}O_3N$ (mol. weight 457.50) (percent): C, 81.38; H, 5.07; N, 3.06. Found (percent): C, 81.26; H, 5.18; N, 2.86.

(20)
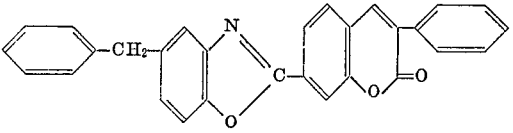

Light-yellow small needles from xylene, melting at 255 to 256° C.

Calc'd for $C_{29}H_{19}O_3N$ (mol. weight 429.45) (percent): C, 81.10; H, 4.46; N, 3.26. Found (percent): C, 81.19; H, 4.64; N, 3.27.

(21)
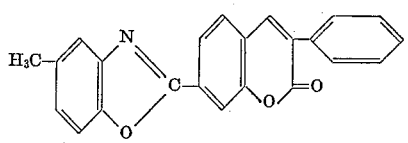

Light-yellow small needles from chlorobenzene, melting at 289 to 290° C.

Calc'd for $C_{23}H_{15}O_3N$ (mol. weight 353.36) (percent): C, 78.17; H, 4.28; N, 3.96. Found (percent): C, 78.44; H, 4.36; N, 3.71.

(22)
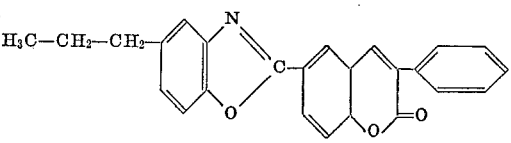

Light-yellow small needles from xylene, melting at 230 to 231° C.

Calc'd for $C_{25}H_{19}O_3N$ (mol. weight 381.41) (percent): C, 78.72; H, 5.02; N, 3.67. Found (percent): C, 78.98; H, 5.24; N, 3.82.

(23)
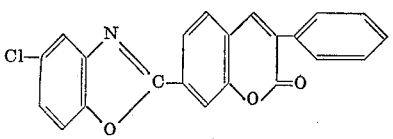

Light-yellow small, felted needles from xylene, melting at 280 to 281° C.

Calc'd for $C_{22}H_{12}O_3NCl$ (mol. weight 373.80) (percent): C, 70.69; H, 3.24; N, 3.75. Found (percent): C, 70.58; H, 3.25; N, 3.78.

(24)
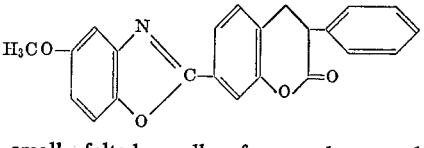

Yellow, small, felted needles from xylene, melting at 245 to 246° C.

Calc'd for $C_{23}H_{15}O_4N$ (mol. weight 369.36) (percent): C, 74.79; H, 4.09; N, 3.79. Found (percent): C, 75.08; H, 4.10; N, 3.82.

(25)
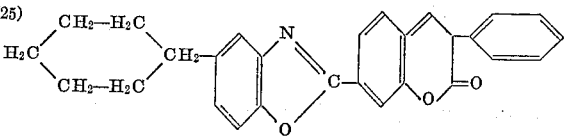
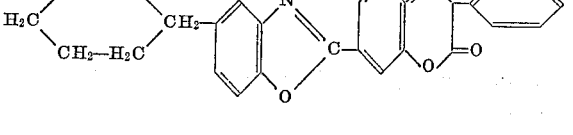

Pale yellowish prisms from xylene, melting at 280 to 281° C.

Calc'd for $C_{28}H_{23}O_3N$ (mol. weight 421.472) (percent): C, 79.79; H, 5.50; N, 3.32. Found (percent): C, 79.79; H, 5.55; N, 3.49.

(26)

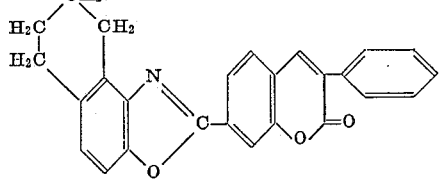

Dark yellow, crystalline precipitate from xylene, melting at 270 to 272° C.

Calc'd for $C_{26}H_{19}O_3N$ (mol. weight 293.420) (percent): C, 79.37; H, 4.87; N, 3.56. Found (percent): C, 79.49; H, 5.13; N, 3.56.

EXAMPLE 2

A mixture of 7.98 g. of 3-phenylcoumarin-7-carboxylic acid of the Formula 19 in 100 ml. of trichlorobenzene and 25 ml. of thionylchloride is heated for 3 hours at 90 to 95° C. Hydrochloric gas escapes and a clear solution is obtained. The excess thionylchloride is then evaporated under vacuum. The solution of the carboxylic acid chloride in trichlorobenzene is then mixed at 50° C. with 6.3 g. of 4-hydroxy-3-aminobenzoic acid-n-butyl ester. Within 1 hour the batch is heated to 200° C., during which hydrochloric gas escapes and a dark solution is obtained. 500 mg. of boric acid anhydride are then added and within one hour 75 ml. of trichlorobenzene are evaporated drop by drop to yield at 240° C. a clear melt diluted with a small quantity of solvent; it is dissolved in 1.5 litres of hot chlorobenzene, and the solution is decolorized with bleaching earth and evaporated. The precipitate formed is suctioned off at room temperature, washed with methanol and dried, to yield 7 g. of a light-beige powder melting at 231 to 233° C.

Crystallization from xylene with the aid of active carbon furnishes the compound of the formula (7)

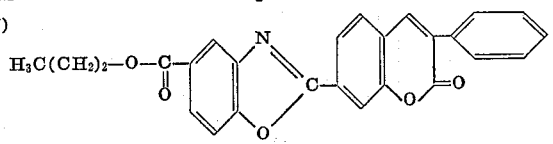

as a light-yellow, crystalline powder melting at 234 to 235° C.

Calc'd for $C_{27}H_{21}O_5N$ (mol. weight 439.45) (percent): C, 73.79; H, 4.82; N, 3.19. Found (percent): C, 73.68; H, 4.88; N, 3.36.

The following 7-benzoxazolyl-coumarin compounds may be prepared in an analogous manner:

(27)

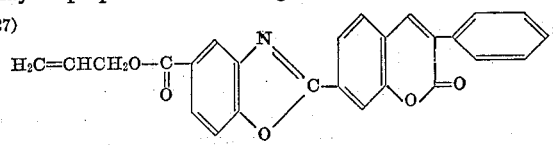

Yellowish, crystalline precipitate from xylene, melting at 250 to 252° C.

Calc'd for $C_{26}H_{17}O_5N$ (mol. weight 423.40) (percent): C, 73.75; H, 4.05; N, 3.31. Found (percent): C, 73.65; H, 4.23; N, 3.42.

(28)

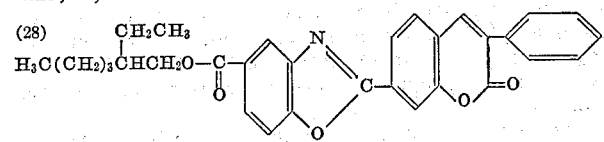

Light-yellow small needles from toluene, melting at 205 to 206° C.

Calc'd for $C_{31}H_{29}O_5N$ (mol. weight 495.55) (percent): C, 75.13; H, 5.90; N, 2.83. Found (percent): C, 75.30; H, 5.94; N, 2.84.

(29)

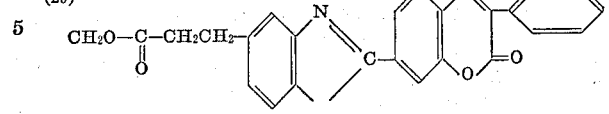

Yellow, crystalline powder from toluene, melting at 216 to 217° C.

Calc'd for $C_{26}H_{19}O_5N$ (mol. weight 425.42) (percent): C, 73.40; H, 4.50; N, 3.29. Found (percent): C, 73.22; H, 4.64; N, 3.31.

(30)

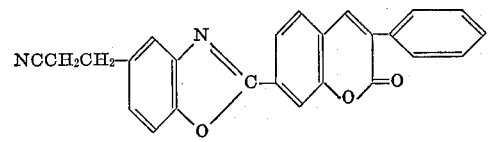

Light-yellow flakes from chlorobenzene, melting at 279 to 280° C.

Calc'd for $C_{25}H_{16}O_3N_2$ (mol. weight 392.39) (percent): C, 76.52; H, 4.11; N, 7.14. Found (percent): C, 76.23; H, 4.24; N, 7.04.

(31)

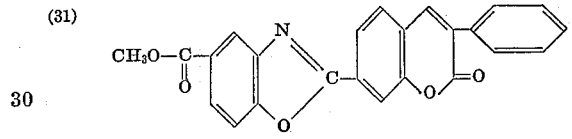

Yellowish, crystalline powder from xylene, melting at 257 to 258° C.

Calc'd for $C_{25}H_{17}O_6N$ (mol. weight 427.39) (percent): C, 70.25; H, 4.01; N, 3.28. Found (percent): C, 70.04; H, 4.03; N, 3.27.

(32)

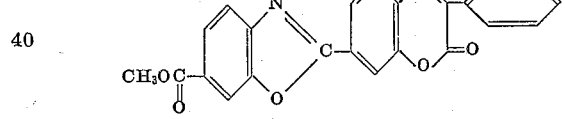

Pale-yellow, small needles from chlorobenzene, melting at 286 to 287° C.

Calc'd for $C_{24}H_{15}O_5N$ (mol. weight 397.368) (percent): C, 72.54; H, 3.81; N, 3.53. Found (percent): C, 72.37; H, 3.68; N, 3.58.

EXAMPLE 3

While stirring vigorously, 28 g. of the methyl ester of the Formula 32 are suspended in 900 ml. of ethyleneglycol monomethyl ether at the reflux temperature. In the course of 15 minutes a solution of 10 g. of caustic soda in 100 ml. of water is then run in, whereupon a clear, dark yellow solution is obtained, which is refluxed further for 15 minutes, then mixed with hydrochloric acid of 10% strength until a strongly acid reaction has been reached, diluted with 1.5 litres of water and allowed to cool. The voluminous, pale yellow precipitate is suctioned off, washed with water until the washings run neutral, and dried. The product is dissolved in boiling dimethylformamide, a turbidity is filtered off and after evaporation and crystallization 25 g. of a yellow precipitate are obtained which melts above 350° C. Another crystallization from dimethylformamide furnishes the compound of the formula (33)

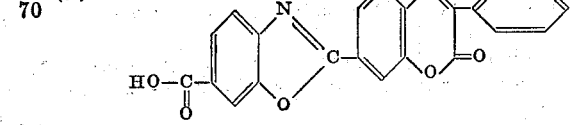

in the form of fine, light yellow needles melting above 350° C.

Calc'd for $C_{23}H_{13}O_5N$ (mol. weight 383.342) (percent): C, 72.06; H, 3.42; N, 3.65. Found (percent): C, 71.51; H, 3.38; N, 3.84.

EXAMPLE 4

A suspension of 5 g. of the carboxylic acid of the Formula 33 in 100 ml. of ortho-dichlorobenzene is mixed with 25 ml. of thionylchloride and 2 drops of pyridine and stirred for 2 hours at 120° C., whereupon a turbid solution forms. The excess thionylchloride is then evaporated under vacuum. There are then added 10 ml. of anhydrous pyridine and 4 ml. of morpholine, and the whole is stirred for 30 minutes at 130 to 135° C., whereupon a yellow precipitate is obtained. The bulk of the solvent is evaporated under vacuum and alcohol is added. The precipitate is suctioned off at room temperature, washed with alcohol and crystallized from dimethylformamide, to yield 4.9 g. of the morpholide of the formula (34)

as a light-yellow powder melting at 281 to 282° C. Crystallization from chlorobenzene with the aid of bleaching earth furnishes light-yellow, fine needles melting at 281 to 282° C.

Calc'd for $C_{27}H_{20}O_5N_2$ (mol. weight 452.446) (percent): C, 71.67; H, 4.46; N, 6.19. Found (percent): C, 71.80; H, 4.48; N, 6.31.

The following 7-benzoxazolyl-coumarin compounds are accessible in a similar manner:

(35)

$CH_3-(CH_2)_7-NH-CO-$

Pale yellowish small needles from chlorobenzene, melting at 257 to 258° C.

Calc'd for $C_{31}H_{30}O_4N_2$ (mol. weight 494.57) (percent): C, 75.28; H, 6.11; N, 5.66. Found (percent): C, 75.52; H, 6.10; N, 5.95.

(36)

$HO-H_2C-CH_2-HN-C-$

Pale yellowish small needles from dimethylformamide, melting at 310° C. with decomposition.

Calc'd for $C_{25}H_{18}O_5N_2$ (mol. weight 426.41) (percent): C, 70.41; H, 4.26; N, 6.57: Found (percent): C, 70.27; H, 4.21; N, 6.61.

EXAMPLE 5

An intimate mixture of 100 g. of polyester granulate from terephthalic acid ethyleneglycol polyester and 0.05 g. of the compound of the Formulae 5, 6, 7, 8, 9 or 15 is fused at 285° C. while being stirred. After spinning from conventional spinnerets strongly brightened polyester fibres are obtained.

Alternatively, the compound of the Formulae 5, 6, 7, 8, 9 or 15 may be added to the starting materials before or during the polycondensation giving rise to the polyester.

EXAMPLE 6

10 kilograms of a polyamide in chip form prepared in known manner from hexamethylenediamine adipate, 30 g. of titanium dioxide (rutile modification) and 2 g. of one of the compounds of the Formulae 5, 6, 7, 8, 9 or 15 are mixed in a tumbler for 12 hours. The chips treated in this manner are then fused in a boiler heated to 300 to 310° C. with oil or diphenyl vapour from which the atmospheric oxygen has been displaced with steam, and the melt is stirred for half an hour and then expressed through a spinneret under a nitrogen pressure of 5 atmospheres (gauge). The resulting filament is allowed to cool and then wound on a spinning bobbin. The filament obtained in this manner display an excellent brightening effect of good fastess to washing and light.

When a polyamide prepared from ε-caprolactam is used instead of the polyamide from hexamethylenediamine adipate, a similar, good, effect is achieved.

EXAMPLE 7

100 grams of polyproylene (fibre grade) are intimately mixed with 0.8 g. of the compound of the Formula 9 or 21 and fused at 280 to 290° C. while being stirred. The melt is spun by the known melt spinning process through conventional spinnerets and then stretched. Strongly brightened polypropylene fibres are obtained.

EXAMPLE 8

Polyvinylchloride fibres ("Thermovyl") are treated at a goods-to-liquor ratio of 1:40 for 60 minutes at 50 to 95° C. with 0.05% of the benzoxazolyl-coumarin compound of the Formula 5, 6 or 7 in a bath containing per litre 2 g. of an adduct of about 35 mols of ethylene oxide and 1 mol of octadecyl alcohol (dispersant). The material is then rinsed and dried. The polyvinylchloride fibres obtained in this manner have a substantially higher white content than the untreated fibres had.

EXAMPLE 9

A polyester fabric (for example "Dacron") is padded at room temperature (about 20° C.) with an aqueous dispersion containing per litre 0.1 to 1 g. of the benzoxazolyl-coumarin compound of the Formula 5, 6, 7 or 8 and 1 g. of an adduct of about 35 mols of ethylene oxide and 1 mol of octadecyl alcohol and then dried at about 100° C. The dry fabric is then subjected for 30 seconds to a heat treatment at about 220° C. The polyester fabric treated in this manner has a substantially higher white content than an untreated polyester fabric.

EXAMPLE 10

Bleached polyamide fabric from staple fibres (nylon spun) is treated at a goods-to-liquor ratio of 1:30 for 30 minutes at 90 to 95° C. in a bath which contains 0.1% (referred to the weight of the fibres) of the compound of the Formula 7, 1% of an adduct of about 35 mols of ethylene oxide and 1 mol of octadecyl alcohol (dispersant) and 1% of acetic acid of 40% strength. After rinsing and drying a substantially higher white content is noticed than with an untreated fabric.

When a fabric from polyamide filament is used instead of the polyamide staple fibre fabric, an equally good brightening effect is achieved.

What is claimed is:

1. A compound of the formula in which $R^y$ is a member selected from the group consisting of hydrogen, alkyl with up to 12 carbon atoms, alkoxy with up to 6 carbon atoms, halogen, cyclohexyl, carboxyl, a carboxylic acid alkyl ester group containing up to 12 carbon atoms in the alkyl group, the carboxylic acid allyl ester group, a carboxylic acid amide group whose amide group is substituted by an alkyl or hydroxyalkyl group containing up to 12 carbon atoms or whose amide group is part of the morpholino ring, a cyanoalkyl group with up to 4 carbon atoms, a phenylalkyl group whose alkyl grouping contains up to 4 carbon atoms and phenyl, p stands for 1, 2 or 3, and two vicinal radicals $R_y$ together with the benzene ring to which they are attached may form a tetrahydronaphthalene ring.

2. A compound according to claim 1 of the formula

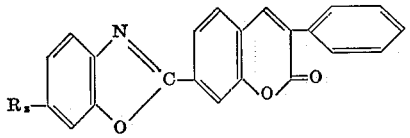

in which $R_z$ represents a member selected from the group consisting of hydrogen, alkyl group with 1 to 8 carbon atoms, an alkoxy group with 1 to 4 carbon atoms, chlorine, the carboxyl group, a carboxylic acid alkyl ester group containing up to 12 carbon atoms in the alkyl group, a carboxylic acid amide group whose amide group is substituted by an alkyl or hydroxyalkyl group containing up to 12 carbon atoms or whose amide group is part of the morpholino ring, phenyl, a phenylalkyl group whose alkyl grouping contains up to 4 carbon atoms, and an alkyl group with 1 to 8 carbon atoms substituted by a nitrile group or carboxylic acid alkyl ester group containing up to 12 carbon atoms in the alkyl group.

3. A compound according to claim 1, which corresponds to the formula

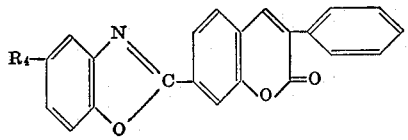

in which $R_4$ represents a member selected from the group consisting of a hydrogen atom, a tertiary butyl group and a phenyl group.

4. A compound according to claim 1, which corresponds to the formula:

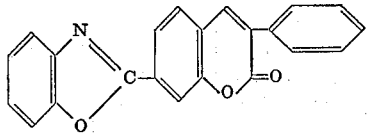

5. A compound according to claim 1, which corresponds to the formula:

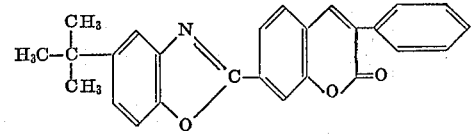

6. A compound according to claim 1, which corresponds to the formula:

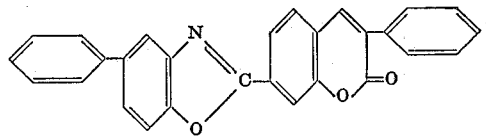

7. A compound according to claim 1, which corresponds to the formula:

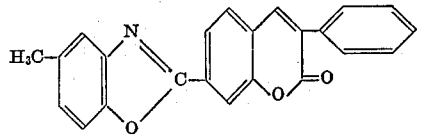

References Cited

UNITED STATES PATENTS 3,014,041  12/1961  Hausermann et al. ___ 260—307

ALTON D. ROLLINS, Primary Examiner

U.S. Cl. X.R.

8—1; 252—117, 152, 301.2; 260—247.2, 304, 247.1, 294.8, 294.9, 295, 309.2, 343.2